Patented Feb. 19, 1924.

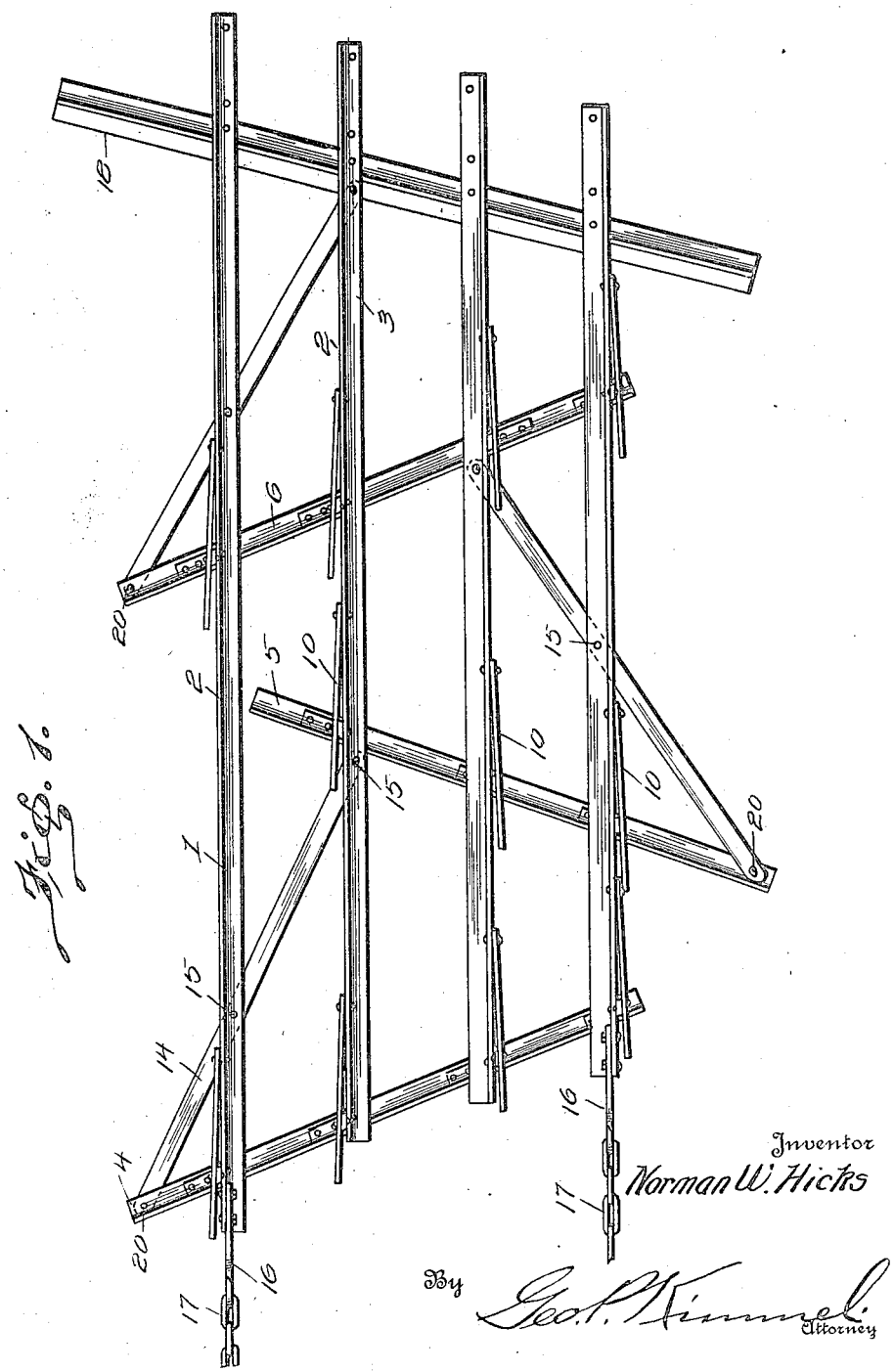

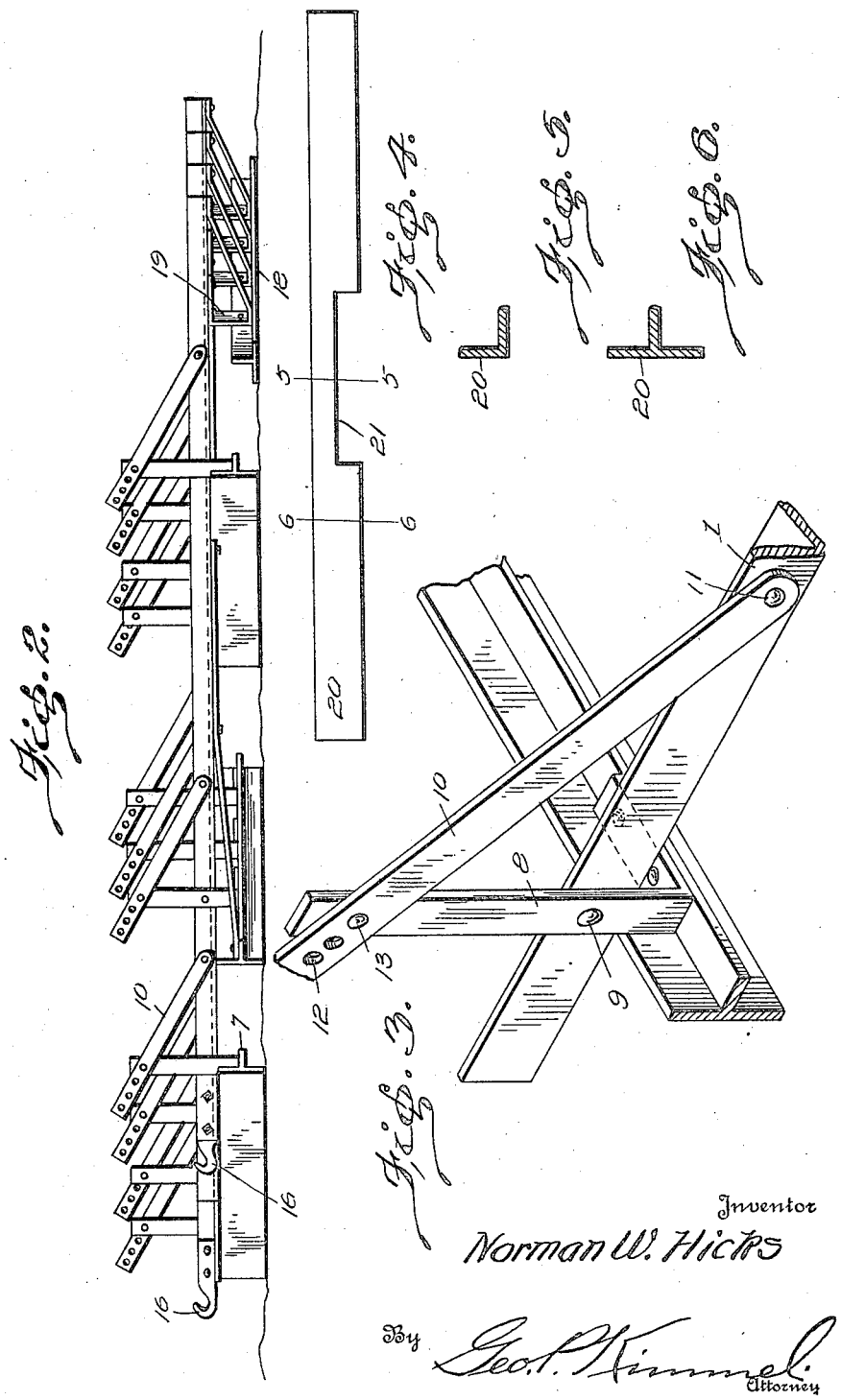

1,484,497

UNITED STATES PATENT OFFICE.

NORMAN W. HICKS, OF MALTA, MONTANA.

ROAD SCRAPER.

Application filed July 19, 1922. Serial No. 575,988.

*To all whom it may concern:*

Be it known that I, NORMAN W. HICKS, a citizen of the United States, residing at Malta, in the county of Phillips and State of Montana, have invented certain new and useful Improvements in Road Scrapers, of which the following is a specification.

This invention has reference to road scrapers or drags and its object is to provide a one-unit structure which will not follow small dips in the surface of the road but will fill up low places and cut down the high points.

Moreover, the road drag of this invention, owing to its length, width and entire weight in one unit will move the earth over ruts a plurality of times, thereby ensuring the proper filling of such ruts and holes, because of the angle of the blades, In addition to the frame and blades, the drag includes a rear blade which levels earth and works stones that constantly accumulate on the surface, to the side of the road.

Moreover, the improved drag omits levers for adjustment but is provided with short arms by which blades can be adjusted, this being shown by experience to be more satisfactory that is, the strain on the blades is not concentrated at one lever but distributed over several arms. The road dragger uses levers but very little as a drag needs but one setting for any section of road.

Experience has taught that adjusting levers are very unsatisfactory as there is so much strain thereon constantly breaking such levers and braces. While, however heavier levers could be attached or several levers could be used on one blade, it is found that the weight and cost thereof increases to too great an extent.

The invention will be best understood from a consideration of the following detailed description taken in connection with the accompanying drawings, forming part of this specification, with the understanding however, that the invention is not confined to strict conformity with the showing of the drawings, but may be changed and modified so long as such changes and modifications mark no material departure from the salient features of the invention as expressed in the appended claims.

In the drawings:—

Figure 1 is a plan view of a drag constructed in accordance with the invention.

Fig. 2 is a longitudinal edge view thereof.

Fig. 3 is a perspective view of a portion of the frame in conjunction with one of the blades and the bracing structure therefor.

Fig. 4 is a modified form of blade.

Fig. 5 is a section on the line 5—5 of Fig. 4.

Fig. 6 is a section on the line 6—6 of Fig. 4.

Referring to the drawings, there is shown a main frame composed of a plurality of longitudinally disposed laterally spaced beams 1, preferably formed of angle steel, each beam having an upright flange 2, along one edge and a horizontal flange 3 at right angles thereto.

In the showing of the drawings, four beams 1 are provided, and these beams are equidistantly spaced crosswise of the direction of travel of the main frame, with two of the beams having upright flanges 2 on one side of the common center line and the other two beams having the upright flanges 2 on the opposite side of the center line.

Secured to the beams 1 there are provided three scraping blades 4, 5 and 6, respectively, each of which, in the structure shown in Figs. 1, 2 and 3, is composed of a bar of T form with the intermediate webs 7 horizontal and connected to the horizontal arms 8' of the right angled bracket 8 the vertical arms of which bracket rises above the blade and also the respective main frame beam 1. Each vertical arm 8 is pivotally connected by bolts 9 to the respective beam 1 and to the intermediate web 7 of the respective blades 4, 5 and 6, and the upright arm of the brackets 8 is joined by braces 10 to the upright web of the respective beam 1.

Each brace bar 10 is provided where joining a beam 1 with a single bolt connection 11 while at the other end where joining the upright arm of the bracket 8, the bar 10 is furnished with a series of holes 12 through any one of which a bolt 13 may be passed.

From the forward end of each blade 4, 5 and 6, rearwardly to a respective one of the beams 2 is another brace bar 14 connected by bolts or rivets 15 to respective ones of the beams 1.

At the forward end of the side longitudinal beams 1, there are secured hooks 16 for the attachment of draft chains 17 to which animal or mechanical draft power may be attached.

Extending laterally of the main frame is an inverted T-shaped leveler bar 18 connected to the longitudinal beams 1 by brackets 19, the leveler being preferably somewhat longer than the effective width of the scraping bar.

By providing each bracket bar 10 with a series of perforations or rivet holes 12, the angle of the scraping bars or beams may be varied within limits.

It is to be understood that the drag is to be furnished with a driver's seat, but as such feature forms no material part of the invention, it has not been shown.

With the drag of this invention, the crown of the road may be increased or diminished by changing the line of travel from one side of the road to the other. Moreover, the drag can be made more rigid than customary, thereby cutting maintenance cost to a minimum.

The original cost is as low or lower than any metal three-way drag on the market.

Since the blades are attached by bolts or rivets they may be readily removed when it is desired to change or adjust the blades.

To reduce the draft resistance, a blade such as illustrated in Figs. 4, 5 and 6 may be employed, such a blade being indicated at 20, being L-shaped in cross section on the line 5—5 of Fig. 4 and T shaped in cross section on the line 6—6 of Fig. 4, such a blade being particularly adapted to light sandy soils or for cutting down the draft. The blade 20 has a two foot opening 21 in the center portion.

The fastening devices 9, 11, 13 and 20 must be bolts, for facility of detachability is essential while other fastening devices may be either bolts or rivets as desired.

What is claimed is:—

1. A road leveling drag, comprising spaced longitudinally disposed angle beams, a series of groups of right angled members each having a vertical and horizontal arm, each vertical arm being pivotally connected to an angle beam, transversely disposed alternately angularly arranged scraping blades connected to and carried by the horizontal arms of each group of right angled members beneath the angle beams, bracket bars secured at one end to each of the beams and at the other end adjustably connected to the upper end of each of the vertical arms, brace bars connected at one end to the outer end of each of the scraping blades and connected at the other end to one or more of the beams, depending bracket members secured to the under side of the beams at the rear thereof, and a leveling bar carried by said bracket members.

2. A road leveling drag comprising spaced longitudinally disposed angle beams, a series of groups of right angled members each having a vertical and horizontal arm, each vertical arm being pivotally connected to an angle beam, transversely disposed alternately angularly arranged scraping blades connected to and carried by the horizontal arms of each group of right angled members, beneath the angle beams, bracket bars secured at one end to each of the beams and at the other end adjustably connected to the upper end of each of the vertical arms, brace bars connected at one end to the other end of each of the scraping blades and connected at the other end to one or more of the beams, depending bracket members secured to the under side of the beams at the rear thereof, and an inverted T-shaped leveling bar of greater length than said scraping bars, extending transversely of and at a slight angle to the beams and carried by said bracket members.

In testimony whereof, I affix my signature hereto.

NORMAN W. HICKS.